US011582950B2

(12) United States Patent  
Kim et al.

(10) Patent No.: US 11,582,950 B2  
(45) Date of Patent: Feb. 21, 2023

(54) PET BATH

(71) Applicant: LG Electronics Inc., Seoul (KR)

(72) Inventors: Minchul Kim, Seoul (KR); Kyungrae Kim, Seoul (KR); Sangwoo Woo, Seoul (KR); Soungbong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 119 days.

(21) Appl. No.: 16/586,264

(22) Filed: Sep. 27, 2019

(65) Prior Publication Data

US 2020/0100464 A1 Apr. 2, 2020

(30) Foreign Application Priority Data

Sep. 29, 2018 (KR) .................. 10-2018-0116666

(51) Int. Cl.
*A01K 13/00* (2006.01)
*A01K 15/04* (2006.01)

(52) U.S. Cl.
CPC ............ *A01K 13/001* (2013.01); *A01K 15/04* (2013.01)

(58) Field of Classification Search
CPC ........ A01K 13/001; A01K 15/04; A61D 7/00; A61D 11/00
USPC ................................ 119/668, 673, 676, 665
See application file for complete search history.

(56) References Cited

U.S. PATENT DOCUMENTS

| 4,011,836 | A | * | 3/1977 | Temel | .................. | A01K 1/011 |
| | | | | | | 119/163 |
| 4,730,576 | A | * | 3/1988 | Yoshikawa | .......... | A01K 13/001 |
| | | | | | | 119/673 |
| 5,148,771 | A | * | 9/1992 | Schuett | .................. | A01K 1/01 |
| | | | | | | 119/479 |
| 5,213,064 | A | * | 5/1993 | Mondine | .............. | A01K 13/001 |
| | | | | | | 119/671 |
| 5,448,966 | A | * | 9/1995 | McKinnon | .......... | A01K 13/001 |
| | | | | | | 119/676 |
| 5,769,029 | A | * | 6/1998 | Marshall | .............. | A01K 13/001 |
| | | | | | | 119/651 |
| 6,435,136 | B1 | * | 8/2002 | Segura Munoz | .... | A01K 13/001 |
| | | | | | | 119/650 |
| 7,080,608 | B1 | * | 7/2006 | Arndt | .................. | A01K 13/001 |
| | | | | | | 119/665 |

(Continued)

FOREIGN PATENT DOCUMENTS

| JP | 2008000095 | 1/2008 |
| JP | 2008237154 | 10/2008 |

(Continued)

OTHER PUBLICATIONS

Extended European Search Report in European Appln. No. 19864454.4, dated May 10, 2022, 9 pages.

(Continued)

*Primary Examiner* — Ebony E Evans
(74) *Attorney, Agent, or Firm* — Fish & Richardson P.C.

(57) ABSTRACT

Disclosed herein is a pet bath. The pet bath includes a casing provided with an entrance formed in a front surface thereof and having an open upper surface so as to form a bathing enclosure, a door configured to open and close the entrance, and upper shower nozzles disposed at a position higher than the upper surface of the casing to spray water to the inside of the bathing enclosure.

17 Claims, 9 Drawing Sheets

(56) References Cited

U.S. PATENT DOCUMENTS

| | | | | |
|---|---|---|---|---|
| 7,497,188 | B2* | 3/2009 | Cho | A01K 13/001 |
| | | | | 119/604 |
| 9,074,376 | B2* | 7/2015 | Dustin | A01K 1/01 |
| 10,143,182 | B1* | 12/2018 | Ferro | D06F 18/00 |
| 2003/0000482 | A1 | 1/2003 | Batterton | |
| 2009/0314217 | A1* | 12/2009 | Hurwitz | A61D 11/00 |
| | | | | 119/400 |
| 2011/0017147 | A1* | 1/2011 | Petruzzi | A01K 13/001 |
| | | | | 119/604 |
| 2011/0297103 | A1* | 12/2011 | Iou | A01K 13/001 |
| | | | | 119/676 |
| 2012/0037085 | A1* | 2/2012 | Caisse | A01K 13/001 |
| | | | | 119/676 |
| 2017/0354309 | A1* | 12/2017 | Kim | A47L 15/4257 |
| 2021/0113054 | A1* | 4/2021 | Son | A47L 15/00 |

FOREIGN PATENT DOCUMENTS

| | | |
|---|---|---|
| KR | 100720736 | 5/2007 |
| KR | 101140913 | 5/2012 |
| KR | 20160026939 | 3/2016 |
| KR | 101720421 | 3/2017 |

OTHER PUBLICATIONS

International Search Report in International Appln. No. PCT/KR2019/012616, dated Jan. 23, 2020, 3 pages.

* cited by examiner

PET BATH

CROSS-REFERENCE TO RELATED APPLICATION

This application claims the priority benefit of Korean Patent Application No. 10-2018-0116666, filed on Sep. 29, 2018, the disclosure of which is incorporated herein by reference.

BACKGROUND OF THE INVENTION

1. Field of the Invention

The present disclosure relates to an apparatus in which a pet may be bathed, and more particularly, to a pet bath in which the upper surface of a bathing enclosure may be open.

2. Description of the Related Art

Recently, as the number of people who keep pets has increased, affection and concern for pets has also increased, and thus, many apparatuses for pets have been developed.

Pets must be periodically bathed, but a bathroom of a general home is designed with the goal of human convenience, and it is inconvenient to bathe a pet therein. For example, when a dog is bathed on a bathroom floor or in a simple bathtub using a shower, if the dog recklessly moves or wags its trunk or tail to instinctively shake water off its body, water or bubbles are spattered in all directions, thus contaminating the bathroom.

In order to solve this problem, U.S. Pat. No. 7,497,188 B2 discloses a pet bath including an inner casing for accommodating a pet and a nozzle unit for spraying water to the inside of the inner casing. In the pet bath disclosed in U.S. Pat. No. 7,497,188 B2, when an entrance formed on the front surface of the inner casing is closed by a door, the casing forms a closed space and thus prevent water from splattering or leaking to the outside of the casing, but the pet is confined in the casing and may thus suffer from stress.

Further, when a specific pet (for example, a feline animal) dislikes its face getting wet, the pet bath disclosed in U.S. Pat. No. 7,497,188 B2 is only capable of applying water to the entire body of the pet, and thus there is no method of protecting the face of the pet from water.

In addition, although the pet bath disclosed in U.S. Pat. No. 7,497,188 B2 includes a transparent door to secure a sense of openness, the structure conveys a sense of openness only from a visual aspect, but is still spatially closed, thus generating an echo. The operating noise generated by a pump, etc. to supply water to the nozzle unit or a barking or roaring sound of the pet echoes in the casing of the pet bath, which may increase the stress of the pet.

Also, the pet bath disclosed in U.S. Pat. No. 7,497,188 B2 allows only pets having heights lower than the ceiling of the inner casing to be washed, and may thus be unsuitable for washing various kinds of pets having different heights.

SUMMARY OF THE INVENTION

An object of the present disclosure is to provide a pet bath in which the upper surface of a bathing enclosure is open.

Another object of the present disclosure is to provide a pet bath in which the height of upper shower nozzles is adjustable.

Another object of the present disclosure is to provide a pet bath in which the height of upper shower nozzles is automatically variable.

Another object of the present disclosure is to provide a pet bath in which the position of upper shower nozzles is higher than the overall height of a bathing enclosure.

Another object of the present disclosure is to provide a pet bath in which upper shower nozzles are installed on upper covers operated in a hinge-operated manner to open and close the upper surface of a bathing enclosure.

Another object of the present disclosure is to provide a pet bath which may apply water only to the trunk of a pet, and not to the face of the pet.

Yet another object of the present disclosure is to provide a pet bath which may prevent an echo of noise in a bathing enclosure and thus alleviate stress applied to a pet due to the noise.

The objects of the present disclosure are not limited to the above-mentioned objects and other objects that have not been mentioned above will become evident to those skilled in the art from the following description.

To achieve the above objects, there is provided a pet bath according to an exemplary embodiment of the present disclosure, including a casing provided with an entrance formed in a front surface thereof and having an open upper surface so as to form a bathing enclosure, a door configured to open and close the entrance, and upper shower nozzles disposed at a position higher than the upper surface of the casing to spray water to an inside of the bathing enclosure.

The pet bath may further include movable arms coupled to the upper surface of the casing so as to be vertically rotatable. The upper shower nozzles may be provided on the movable arms.

The movable arms may include two or more movable arms. The two or more movable arms may include a first movable arm and a second movable arm provided at both sides of the upper surface of the casing. Each of the upper shower nozzles may be respectively provided on the first movable arm and the second movable arm.

Each of the first movable arm and the second movable arm may include a casing coupling part coupled to the upper surface of the casing to form a pivot joint. The upper shower nozzles may be disposed at positions spaced apart from the casing coupling parts. The upper shower nozzles may include a plurality of spray holes arranged in a direction parallel to an axial direction of the pivot joints.

The pet bath may further include at least one arm driving unit configured to rotate the first movable arm and the second movable arm.

The pet bath may further include a rotation setting unit configured to receive a command for controlling a rotation angle of at least one of the first movable arm or the second movable arm.

The first movable arm and the second movable arm may overlap an opening formed in the upper surface of the casing, when viewed from the top. Each of the first movable arm and the second movable arm may be rotated between a closed position for closing the opening and an opened position for opening the opening.

The pet bath may further include a shower water supply hose formed of a soft material so as to guide water, and a movable shower nozzle connected to the shower water supply hose outside the casing so as to spray water to the inside of the bathing enclosure.

The pet bath may further include a stand disposed in the casing and having at least one roller so as to support a pet. A lower end of the door may be rotatably connected to the casing, and at least one rail may be provided on a rear surface of the door, defining the bathing enclosure, so as to guide movement of the at least one roller in a state in which the door is opened such that the rear surface of the door is disposed horizontally.

A discharge hole configured to discharge water sprayed from the upper shower nozzles may be formed through a bottom of the bathing enclosure. The pet bath may further include a water collection tank disposed under the bathing enclosure in the casing so as to collect water discharged through the discharge hole, and a pump configured to circulate water collected in the water collection tank to the upper shower nozzles.

The pet bath may further include a lower shower nozzle disposed under the stand so as to spray water pumped by the pump upwards. The pet bath may further include a filter configured to filter water discharged through the discharge hole and collected in the water collection tank.

To achieve the above objects, there is provided a pet bath according to an exemplary embodiment of the present disclosure, including a casing having an open upper surface so as to form a bathing enclosure, upper covers configured to open and close the upper surface of the casing, and upper shower nozzles disposed on the upper covers to spray water to an inside of the bathing enclosure.

A discharge hole configured to discharge water sprayed from the upper shower nozzles may be formed through a bottom of the bathing enclosure. The pet bath may further include a water collection tank disposed under the bathing enclosure in the casing so as to collect water discharged through the discharge hole, and a pump configured to circulate water collected in the water collection tank to the upper shower nozzles. The pet bath may further include a filter configured to filter water discharged through the discharge hole and collected in the water collection tank.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

The advantages and features of the present disclosure and the way of attaining the same will become apparent with reference to embodiments described below in conjunction with the accompanying drawings. Reference will now be made in detail to the preferred embodiments of the present disclosure, examples of which are illustrated in the accompanying drawings. Wherever possible, the same reference numbers will be used throughout the drawings to refer to the same or like parts.

Figure 1:
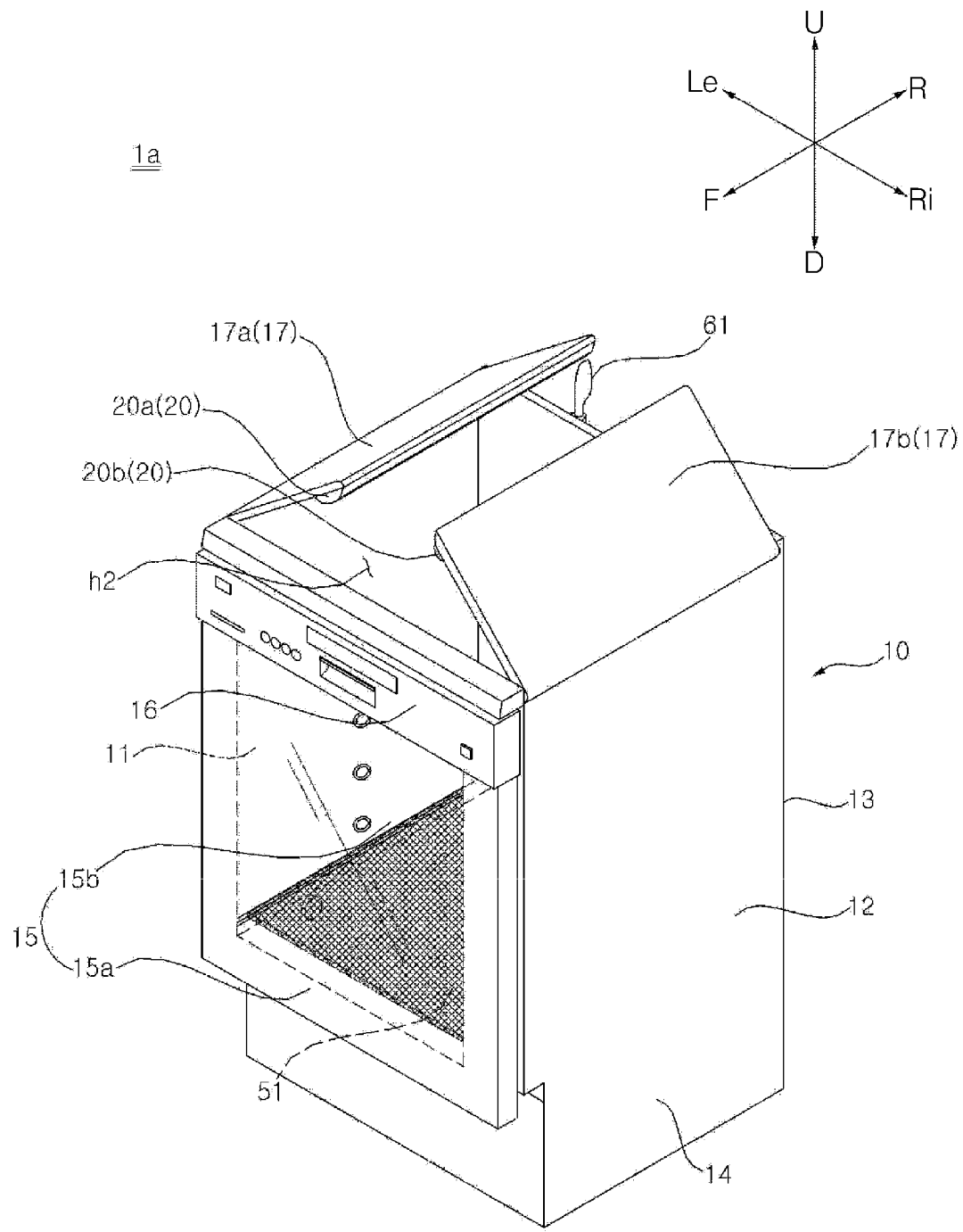
FIG. 1 is a perspective view of a pet bath in accordance with one embodiment of the present disclosure.
Figure 2:
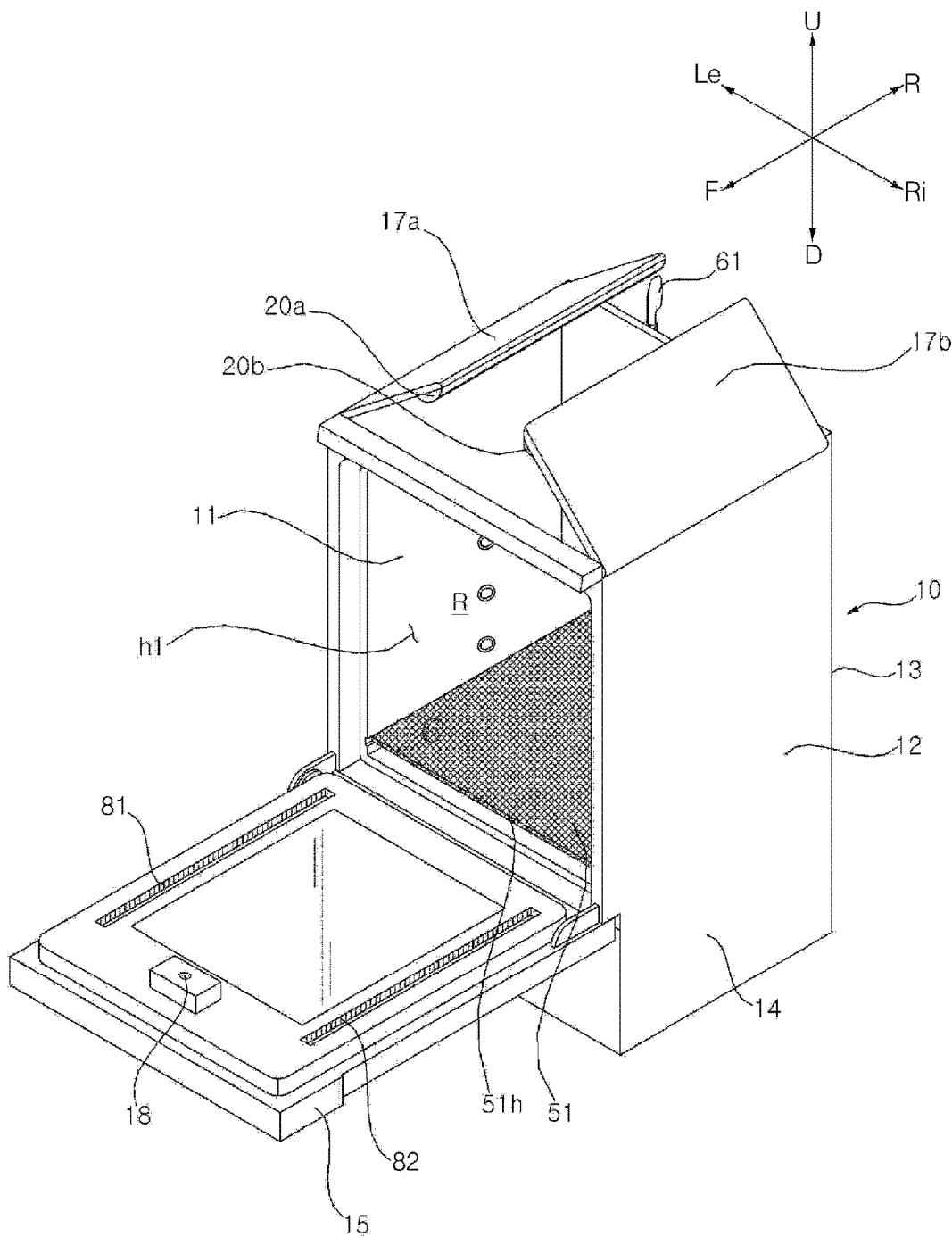
FIG. 2 is a perspective view illustrating the pet bath in a state in which a door is open.
Figure 3:
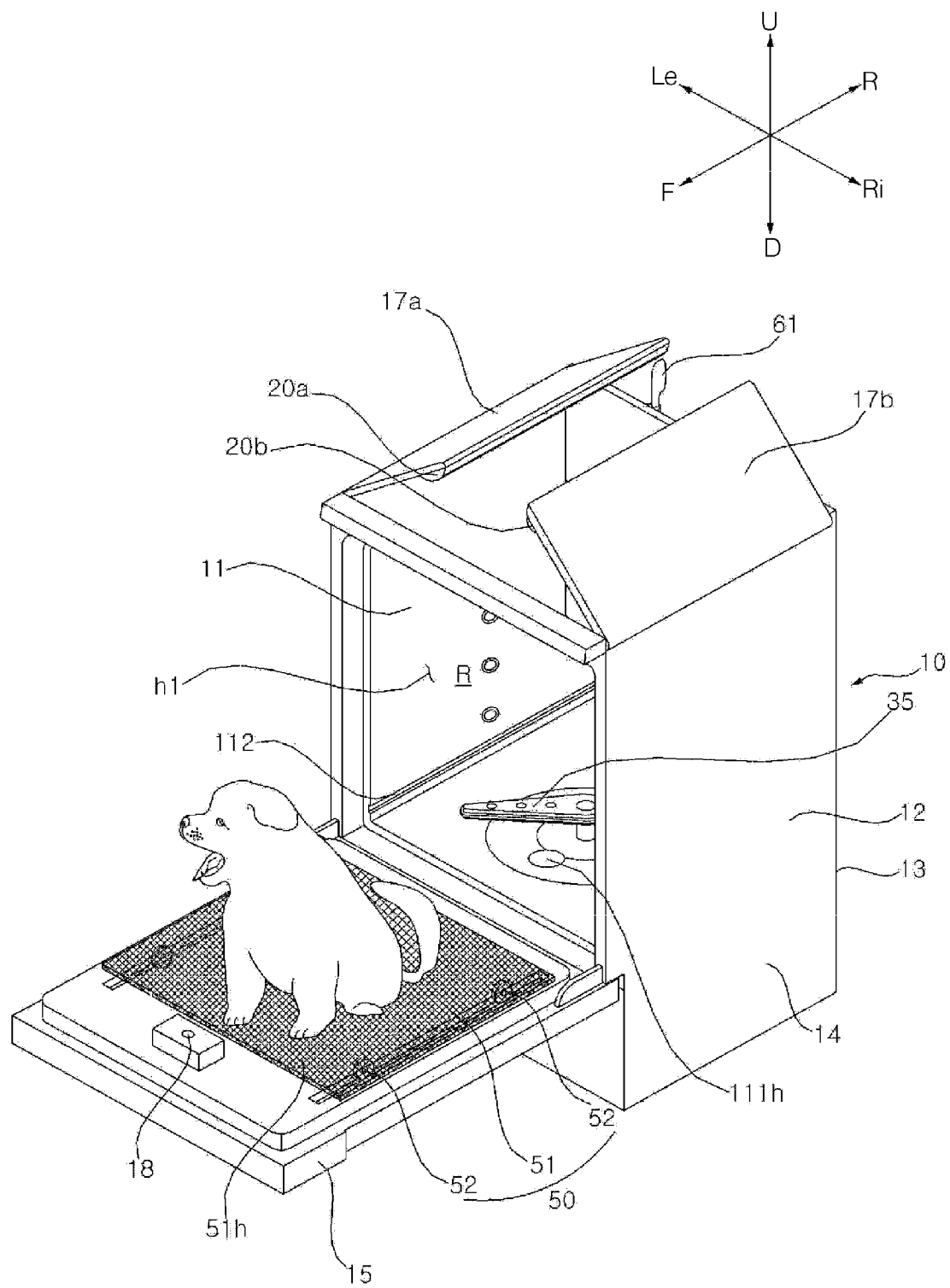
FIG. 3 is a perspective view illustrating the pet bath in a state in which a stand assembly is withdrawn.
Figure 4:
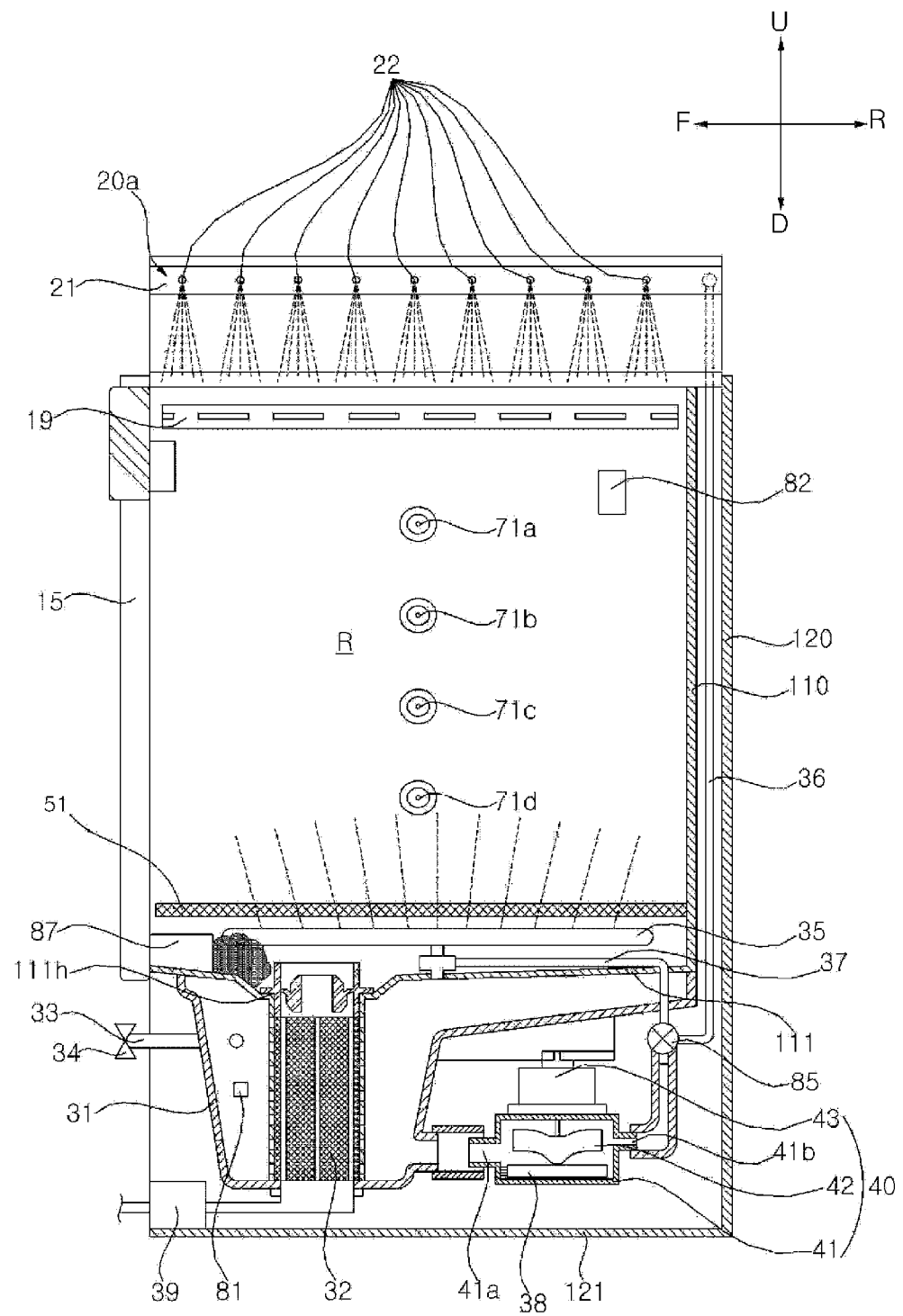
FIG. 4 is a side sectional view of the pet bath of FIG. 1.
Figure 5:
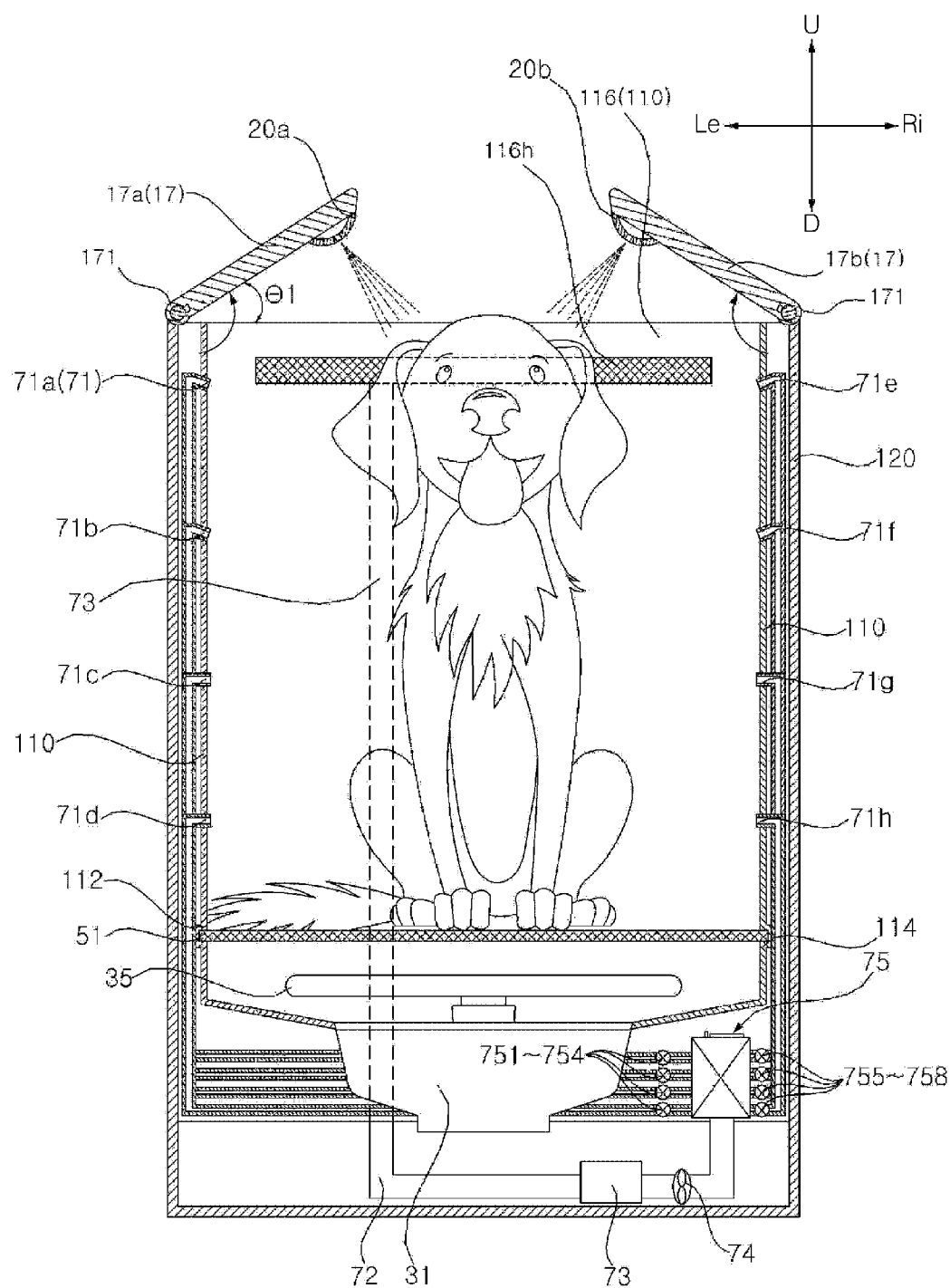
FIG. 5 is a front sectional view of the pet bath of FIG. 1, illustrating a state in which movable arms are located at a lowered position.
Figure 6:
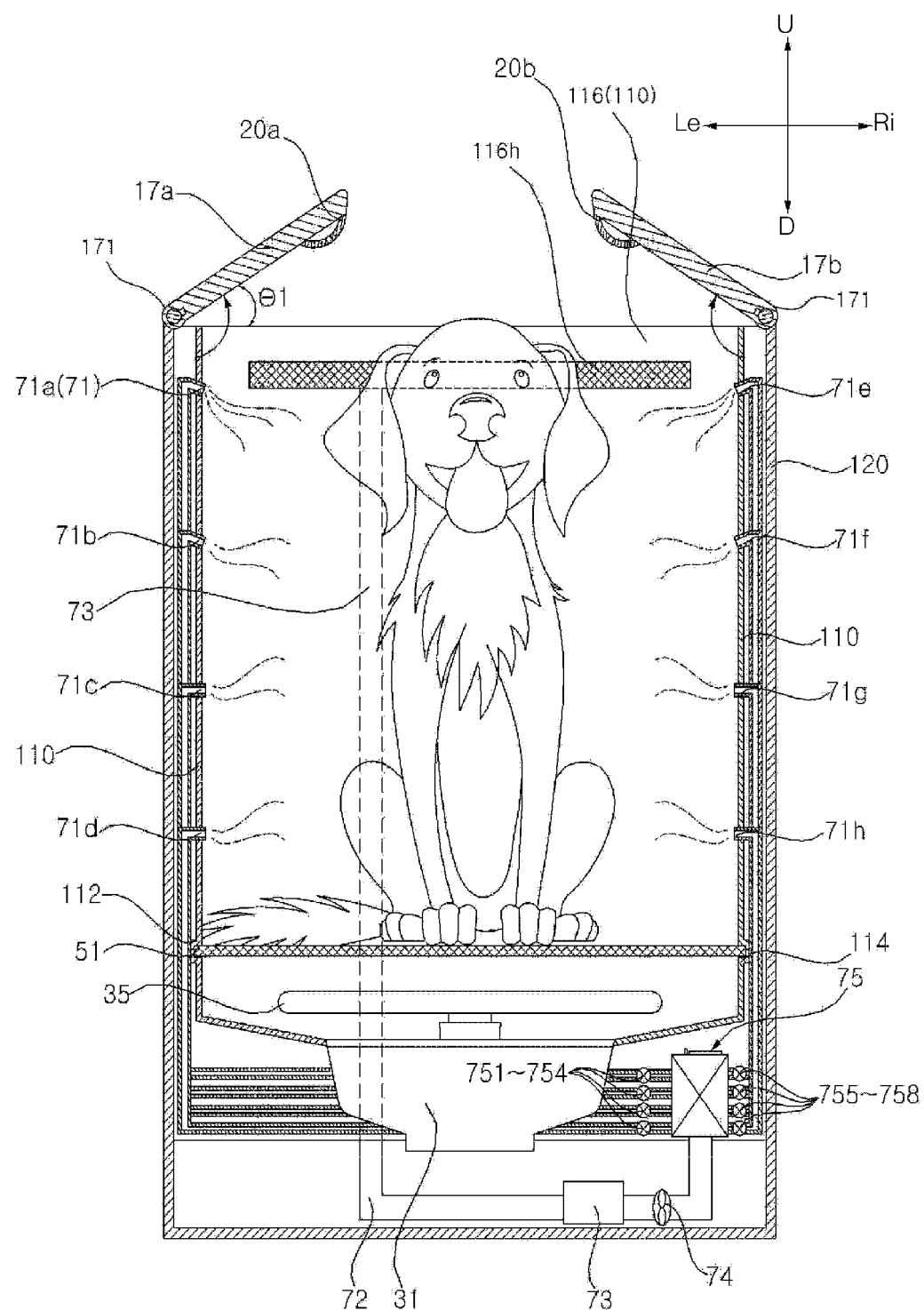
FIG. 6 is a view illustrating the pet bath in a state in which drying is carried out.
Figure 7:
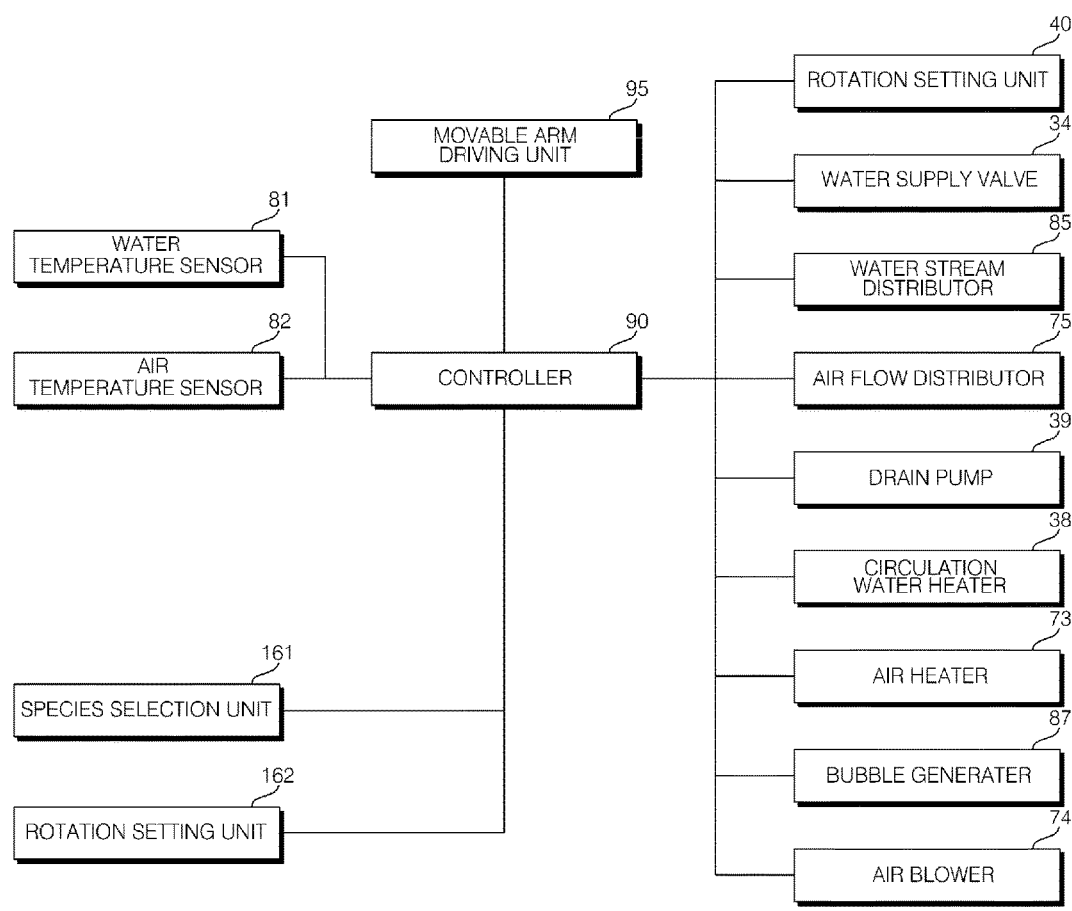
FIG. 7 is a block diagram illustrating control relationships between main elements of the pet bath in accordance with one embodiment of the present disclosure.
Figure 8:
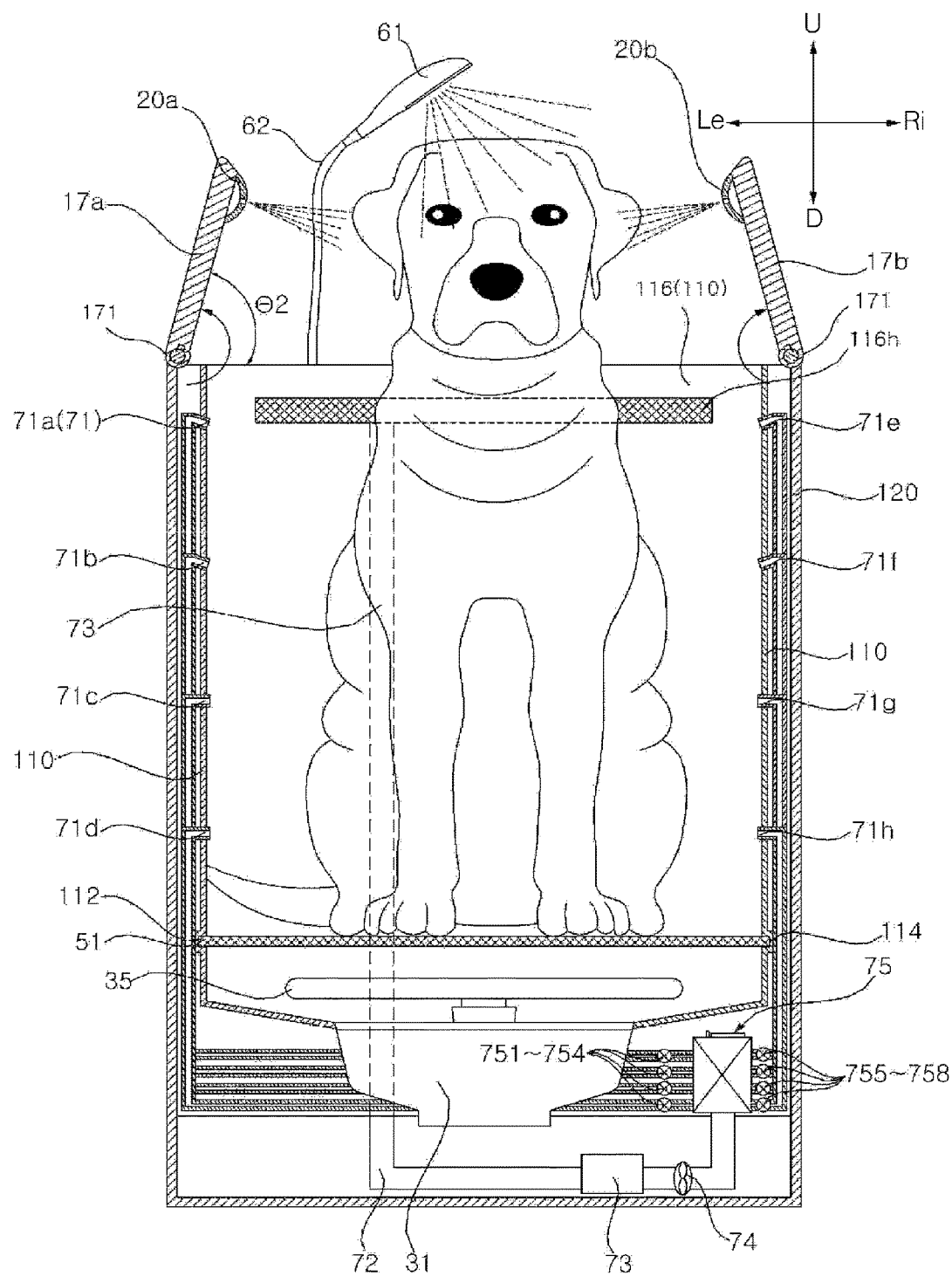
FIG. 8 is a front sectional view of the pet bath in state in which the movable arms are located at a raised position.

FIG. 1 is a perspective view of a pet bath in accordance with one embodiment of the present disclosure. FIG. 2 is a perspective view illustrating the pet bath in a state in which a door is open. FIG. 3 is a perspective view illustrating the pet bath in a state in which a stand assembly is withdrawn. FIG. 4 is a side sectional view of the pet bath of FIG. 1. FIG. 5 is a front sectional view of the pet bath of FIG. 1, illustrating a state in which movable arms are located at a lowered position. FIG. 6 is a view illustrating the pet bath in a state in which drying is carried out. FIG. 7 is a block diagram illustrating control relationships between main elements of the pet bath in accordance with one embodiment of the present disclosure. FIG. 8 is a front sectional view of the pet bath in state in which the movable arms are located at a raised position. Hereinafter, with reference to FIGS. 1 to 8, the pet bath in accordance with one embodiment of the present disclosure will be described.

A pet bath 1a in accordance with one embodiment of the present disclosure includes a casing 10 which forms a bathing enclosure R, and at least one shower nozzle 20 and 35 which sprays water into the bathing enclosure R. The bathing enclosure R has an entrance h1 formed in the front surface thereof, and at least a part of the upper surface of the bathing enclosure R is open.

The entrance h1 is formed in the front surface of the casing 10, an opening h2 is formed in the upper surface of the casing 10, and the casing 10 has a box shape having a left wall 11, a right wall 12, a rear wall 13 and a bottom 14.

A door 15 may be rotatably provided on the casing 10 so as to open and close the entrance h1. The lower end of the door 15 may be rotatably connected to the casing 10 (or an outer cabinet 120, which will be described below).

Referring to FIG. 4, the casing 10 may include an inner cabinet 110 which defines the bathing enclosure R, and the outer cabinet 120 which surrounds the inner cabinet 110 and forms the external appearance of the pet bath 1a. The inner surface of the outer cabinet 120 is spaced apart from the outer surface of the inner cabinet 110, and thus a first circulation pipe 36 to supply water to upper shower nozzles 20 may be disposed between the inner surface of the outer cabinet 120 and the outer surface of the inner cabinet 110.

The upper shower nozzles 20 are disposed at a higher position than the upper surface of the casing 10. Therefore, even a pet that is taller than the overall height of the bathing enclosure R may be bathed using the upper shower nozzles 20. In general, pets suffer from stress, such as fear, anxiety, etc., in a confined environment. Therefore, the bathing enclosure R having the opening h2 formed in the upper surface thereof communicates with the outside not only visually but also spatially and may thus provide a sense of openness, and the head of a tall pet protrudes to the outside of the bathing enclosure R through the opening h2 and thus stress applied to the pet may be reduced. Further, a feline pet that dislikes its face getting wet may be bathed under the condition that the face is picked out of the bathing enclosure R through the opening h2.

Further, during a process of bathing a pet, a user may communicate with the pet in the bathing enclosure R through the opening h2, and push its/her hands into the opening h2 to directly wash the pet with a brush or soap.

Referring to FIG. 4, a plurality of spray holes 22 is formed in one nozzle body 21 of the upper shower nozzle 20. In this case, the nozzle body 21 forms a common flow path to guide water to the spray holes 22. However, the disclosure is not limited thereto and, in accordance with embodiments, a plurality of shower nozzles having spray holes therein may be provided.

A water collection tank 31, which collects water discharged from the bathing enclosure R, may be disposed under the bathing enclosure R in the casing 10. The water collection tank 31 may be disposed between a bottom 111 of the inner cabinet 110 and a bottom 121 of the outer cabinet 120.

A discharge hole 111h to discharge water sprayed from the shower nozzles 20 is formed in the bottom of the bathing enclosure R (or the bottom 111 of the inner cabinet 110), and water discharged through the discharge hole 111h may be collected in the water collection tank 31.

A circulation pump 40 which circulates water collected in the water collection tank 31 to the upper shower nozzles 20 may be provided. The circulation pump 40 may include a pump case 41 connected to the water collection tank 31 by a flow path, an impeller 42 rotatably provided in the pump case 41, and a pump motor 43 to rotate the impeller 42.

A circulation water heater 38 which heats water circulated to the nozzles 20 and 35 (hereinafter, referred to as "circulation water") may be provided. The circulation water heater 38 may be disposed in the pump case 41. However, the disclosure is not limited thereto, and the circulation water heater 38 may be disposed at any positions on a flow path through which the circulation water is guided. For example, the circulation water heater 38 may be disposed in the water collection tank 31.

A filter 32 which filters water collected in the water collection tank 31 may be further provided. The filter 32 may be provided on a flow path through which water is guided from the discharge hole 111h to the water collection tank 31. The filter 32 may be separated from the flow path. Foreign substances, such as pet fur, dirt, etc. floating in water, may be collected by the filter 32, and then the user may pull out the filter 32 to remove the collected foreign substances.

A water supply pipe 33, which guides water supplied from an external water source, such a faucet in a home, to the water collection tank 31, and a water supply valve 34, which controls the water supply pipe 33, may be further provided. A controller 90 (in FIG. 7) opens the water supply valve 34 to supply water to the water collection tank 31 at an initial stage of operation of the pet bath 1a, and then operates the circulation pump 40 to pump water from the water collection tank 31 to the at least one shower nozzle 20 and 35

Since, after a designated amount or more of water is supplied through the water supply pipe 30, water sprayed from the shower nozzles 20 and 35 is collected in the water collection tank 31 and then pumped to the shower nozzles 20 and 35 by the circulation pump 40 so as to constitute a circulation cycle, when an amount of supplied water reaches the designated amount, the controller 90 may close the water supply valve 34.

An inlet of the circulation pump 40 communicates with the water collection tank 31, and an outlet of the circulation pump 40 is connected to circulation pipes 36 and 37 (or by flow paths). On flow paths which guide water from the circulation pump 40 to the shower nozzles 20 and 35, a valve to control each of the flow paths may be provided.

A drain pump 39 which drains water collected in the water supply tank 31 to the outside may be provided. The drain pump 39 may be operated under the control of the controller 90. When the drain pump 39 is operated, foreign substances collected in the filter 32 may be discharged.

A stand 51 which supports a pet may be provided in the casing 10. The stand 51 may have an approximately flat plate shape such that the pet is placed on the upper surface thereof, and a plurality of through holes 51h may be formed through the stand 51 so that water falling down to the upper surface of the stand 51 may be discharged downwards. The stand 51 may have various structures, including a mesh-type wire or rack structure, a plate structure provided with through holes, etc.

The stand 51 may be spaced from the bottom of the bathing enclosure R. A pair of stand guides 112 and 114 which supports both side parts of the stand 51 may be formed on the side surfaces of the bathing enclosure R (or the inner surface of the inner cabinet 110). The stand 51 may be moved along the stand guides 112 and 114 in the forward and rearward directions of the bathing enclosure R.

The respective stand guides 112 and 114 may be formed as support grooves formed in the side surfaces of the bathing enclosure R, and in this case, the stand 51 may be supported by inserting the side parts of the stand 51 into the support grooves 112 and 114 so as to be engaged therewith.

The support grooves 112 and 114 may extend in the forward and rearward directions of the bathing enclosure R, and in this case, the side parts of the stand 51 are moved along the support grooves 112 and 114 in the forward and rearward directions of the bathing enclosure R and thus the stand 51 may be withdrawn.

The disclosure is not limited thereto, and stationary members fixed to the bathing enclosure R and movable members fixed to the stand 51 and supported by the stationary members may be provided, and the movable members may be engaged with the stationary members so as to be movable with respect to the stationary members.

Rollers 52 may be coupled to the bottom surface of the stand 51. In this case, an assembly of the stand 51 and the rollers 52 may be defined as a stand assembly 50. The rollers 52 may be provided in plural so as to maintain balance of the stand 51.

Referring to FIG. 2, the door 15 may have a plurality of rails 81 and 82 on the rear surface thereof which defines the bathing enclosure R. At least one roller 52 rolls along each rail 81 or 82, thereby realizing the withdrawing operation of the stand assembly 50. Under the condition that the door 15 is rotated forwards with respect to the casing 10 so as to be opened such that the rear surface of the door 15 is disposed horizontally, the stand 51 may be moved due to rolling of the rollers 52, thereby being inserted into/withdrawn out of the bathing enclosure R.

However, the disclosure is not limited thereto, and at least one roller (more particularly, a plurality of rollers) 52 may be disposed on the rear surface of the door 15, and the stand 51 may be moved in the forward and rearward directions under the condition that the bottom surface of the stand 51 is supported by the at least one roller 52.

A care agent supply unit 18 which supplies care agents, such as soap, shampoo, conditioner, etc., to the inside of the bathing enclosure R may be further provided. The care agent supply unit 18 may include a care agent receipt unit which is filled with a care agent suitable for the type of the pet, and be configured such that raw water supplied through the water supply pipe 33 passes through the care agent receipt unit, and thus the care agent is diluted with the raw water and then supplied to the inside of the bathing enclosure R.

Referring to FIG. 4, a bubble generator 87 serves to supply bubbles to the inside of the bathing enclosure R. For example, the bubble generator 87 may include a container which is filled with soap for bubbles, a flow path through which water is supplied to the container, and an agitator which agitates a mixture of the soap and water filling the container.

A lower shower nozzle 35 to spray water upwards may be disposed under the stand 51. Water pumped by the circulation pump 40 may be sprayed through the lower shower nozzle 35. Water sprayed from the lower shower nozzle 35 passes through the through holes 51h formed through the stand 51 and is then applied to the pet. Thereby, the soles of the feet, the abdomen, the anus, etc. of the pet may be washed clean.

The lower shower nozzle 35 may have at least one spray hole which is open upwards. Since the lower shower nozzle 35 is rotatably connected to a second circulation pipe 37 and the at least one spray hole is open to be biased so that the discharge direction of a water stream has a circumferential directional component, the lower shower nozzle 35 may be rotated due to the pressure of the water stream discharged through the at least one spray hole.

A water stream distributor 85 which distributes water pumped by the circulation pump 40 to the lower shower nozzle 35 and/or the upper shower nozzles 20 may be further provided. The water stream distributor 85 may be a 3-way valve having one inlet port into which water discharged from the circulation pump 40 flows, a first outlet port through which water flowing into the inlet port is discharged to a first circulation pipe 36 connected to the upper shower nozzles 20, and a second outlet port through which water flowing into the inlet port is discharged to the second circulation pipe 37 connected to the lower shower nozzle 35.

In the water stream distributor 85, opening and closing of the first outlet port and the second outlet port may be selectively carried out by the controller 90. For example, the water stream distributor 85 may be controlled such that one of the first outlet port and the second outlet port may be opened and the other may be closed, or both of the first outlet port and the second outlet port may be opened or closed.

If two upper shower nozzles 20a and 20b are provided as in the embodiment, the first circulation pipe 36 may branch off into two pipes respectively connected to the first upper shower nozzle 20a and the second upper shower nozzle 20b, and valves which are opened and closed by the controller 90 may be respectively provided on the two branch pipes.

The first upper shower nozzle 20a and the second upper shower nozzle 20b may be symmetrical to each other, and in this case, water streams sprayed from the upper shower nozzles 20a and 20b may also be symmetrical to each other. For example, when viewed from the front, the first upper shower nozzle 20a may be disposed at the left side based on the center of the casing 10 and spray water rightwards downwards, and the second upper shower nozzle 20b may be disposed at the right side based on the center of the casing and spray water leftwards downwards.

Referring to FIGS. 4 to 6, air nozzles 71a to 71h which blow air to the inside of the bathing enclosure R may be further provided. The air nozzles 71a to 71h may be provided in plural. An air blower 74 which blows air to the air nozzles 71a to 71h may be provided. A duct 72 which guides air exhausted from the bathing enclosure R to the air nozzles 71a to 71h may be provided. An exhaust port 116h communicating with the duct 72 may be formed in a rear surface 116 of the inner cabinet 110. The air blower 74 may be disposed on a flow path formed by the duct 72.

An air heater 73 which heats air guided along the duct 72 may be further provided. When the air heater 73 and the air blower 74 are operated, air may be supplied to the inside of the bathing enclosure R through the air nozzles 71a to 71h and thus remove moisture from the pet.

The air nozzles 71a to 71h may be provided in plural, and in this case, an air flow distributor 75 which selectively controls flow of air supplied to the air nozzles 71a to 71h may be further provided. The duct 72 may include a plurality of branch pipes to divide the air flow among the air nozzles 71a to 71h, and the air flow distributor 75 may include at least one damper 751 to 758 (in FIG. 5) which selectively opens and closes the branch pipes under the control of the controller 90.

If air heated by the air heater 73 is continuously applied to a designated region of the pet skin, there is a risk of xeroderma and burning. Therefore, the controller 90 may control a spraying time and/or a spraying sequence of the air nozzles 71a to 71b in a predetermined order, thus preventing hot air from being applied to one region for a designated time or more.

An air temperature sensor 82 (in FIG. 4) which senses the temperature of air in the bathing enclosure R may be further provided. The controller 90 may control operation of the air heater 73 based on the temperature sensed by the air temperature sensor 82, thus maintaining the temperature of the air within a designated range.

A control panel 16 (in FIG. 1) which receives various settings from the user may be further provided, and the control panel 16 may include a species selection unit 161 (in FIG. 7) through which the user inputs the kind of the pet. The controller 90 may control the air blower 74, the circulation pump 40, the water supply valve 34, the circulation water heater 38, the air flow distributor 75, the water stream distributor 85, the drain pump 39, the air heater 73 and/or the bubble generator 87 in consideration of the kind of the pet input through the species selection unit 161.

The pet bath 1a may further include movable arms 17 coupled to the upper surface of the casing 10 so as to be vertically rotatable. The upper shower nozzles 20 may be provided on the movable arms 17.

Lower end parts of the movable arms 17 may be hinged to the casing 10 (or the outer cabinet 120), and the upper shower nozzles 20 may be provided at upper end parts of the movable arms 17. The lower ends of the movable arms 17 may be casing coupling parts 171 which are coupled to the upper surface of the casing 10 to form pivot joints.

The upper shower nozzles 20 may be disposed at points spaced apart from the casing coupling parts 171. The position of the movable arms 17 is varied according to the rotation angle of the movable arms 17 around the pivot joints, and thereby, the spraying direction and/or the spraying height of the upper shower nozzles 20 may be adjusted.

A movable arm driving unit 95 (in FIG. 7) which rotates the movable arms 17 about the pivot joints may be further provided. The movable arm driving unit 95 may include a motor (not shown) which generates rotary force, and a power transmission unit (for example, a gear, a link or the like) which transmits the rotary force of the motor to the movable arms 17.

The movable arm driving unit 95 may be operated under the control of the controller 90. The controller 90 may operate the movable arm driving unit 95 according to a pattern which is programmed in advance so as to rotate or tilt the movable arms 17, and thereby, the discharge direction of the upper shower nozzles 20 may be varied. Particularly, the controller 90 may control the movable arm driving unit 95 during operation of the circulation pump 40, thus being capable of achieving 3-dimensional spraying in which a water stream spraying direction is varied in the upward and downward directions.

Two or more movable arms 17a and 17b may be provided. These movable arms 17a and 17b may include a first movable arm 17a and a second movable arm 17b provided at both sides of the upper surface of the casing 10. The first movable arm 17a and the second movable arm 17b may be disposed to be symmetrical to each other, when viewed from the front.

In this embodiment, the first movable arm 17a and the second movable arm 17b are disposed at left and right sides of the casing 10, when viewed from the front of the casing 10. However, the disclosure is not limited thereto, and the first movable arm 17a and the second movable arm 17b may be disposed at forward and rearward positions.

The movable arms 17 may be formed to have a plate shape having a width defined as a distance from the casing coupling parts 171 to the parts of the movable arms 17 at which the upper shower nozzles 20 are installed, and a length defined as a distance from the front ends of the movable arms 17 to the rear ends of the movable arms 17 in a direction parallel to a rotary axis. The nozzle bodies 21 of the upper shower nozzles 20 may extend from the front ends to the rear ends of the movable arms 17, and a plurality of spray holes 22 is arranged in the forward and rearward directions along the nozzle bodies 21.

The movable arms 17 may be tilted (or rotated about the pivot joints) between lowered positions (in FIG. 5) and positions raised from the lowered positions, i.e., raised positions (in FIG. 8). The upper shower nozzles 20 at the lowered positions may be located above the bathing enclosure R (or above the upper surface of the casing 10). In this case, the lowered positions and the raised positions may be set within the range of an acute angle between the movable arms 17 and the upper surface of the casing 10 ($\theta 1 < \theta 2 < 90$ degrees).

The first movable arm 17a and the second movable arm 17b may be controlled so as to maintain symmetry therebetween. That is, the first movable arm 17a and the second movable arm 17b may be rotated at the same angle in opposite directions by the movable arm driving unit 95, and thus, even if the movable arms 17a and 17b are located at any rotated positions, they may maintain a symmetrical arrangement with each other.

Under the condition that the first movable arm 17a and the second movable arm 17b are respectively located at the lowered positions thereof, there is a gap between the first movable arm 17a and the second movable arm 17b (referring to FIG. 5), and a part of the body (for example, the head) of a pet may be located in the gap, depending on the kind of the pet.

A rotation setting unit 162, through which a command for controlling the rotation angle of at least one of the first movable arm 17a or the second movable arm 17b is input, may be further provided. The controller 90 may control the movable arm driving unit 95 according to the rotation angle input through the rotation setting unit 162, thereby controlling the rotated position(s) of the first movable arm 17a and/or the second movable arm 17b. Input of the rotation angle through the rotation setting unit 162 may be based on the height of the pet, the kind of the pet (for example, the breed of a dog), etc. For example, the rotation setting unit 162 may provide a menu for selecting one of a small-sized dog and a large-sized dog, and when the large-sized dog is selected through the menu, the controller 90 may rotate the first movable arm 17a and the second movable arm 17b up to a greater angle (i.e., an angle rotated from the lower positions thereof), compared to selection of the small-sized dog.

As the first movable arm 17a and the second movable arm 17b are gradually rotated from the lower positions thereof to the raised positions thereof, the gap between the first movable arm 17a and the second movable arm 17b may be widened.

Under the condition that the first movable arm 17a and the second movable arm 17b are respectively located at the lowered positions thereof, the first movable arm 17a and the second movable arm 17b may overlap the opening formed in the upper surface of the casing 10, when viewed from the top, and this state may be maintained during the process of rotating the first movable arm 17a and the second movable arm 17b until the first movable arm 17a and the second movable arm 17b respectively reach the raised positions thereof.

A movable shower nozzle 61 which is movable within a designated range in a state in which a user grasps the movable shower nozzle 61 may be further provided. A shower water supply hose 62 which is soft, flexible or extensible may extend to the outside of the casing 10, and the movable shower nozzle 61 may be connected to the shower water supply hose 62.

The user may supply water to the inside of the bathing enclosure R while moving the movable shower nozzle 61. Raw water from an external water source may be supplied to the shower water supply hose 62. In this case, the movable shower nozzle 61 may be used to rinse the pet so as to remove a detergent or bubbles from the pet. Of course, the user may clean the inside of the bathing enclosure R using the movable shower nozzle 61.

Figure 9:
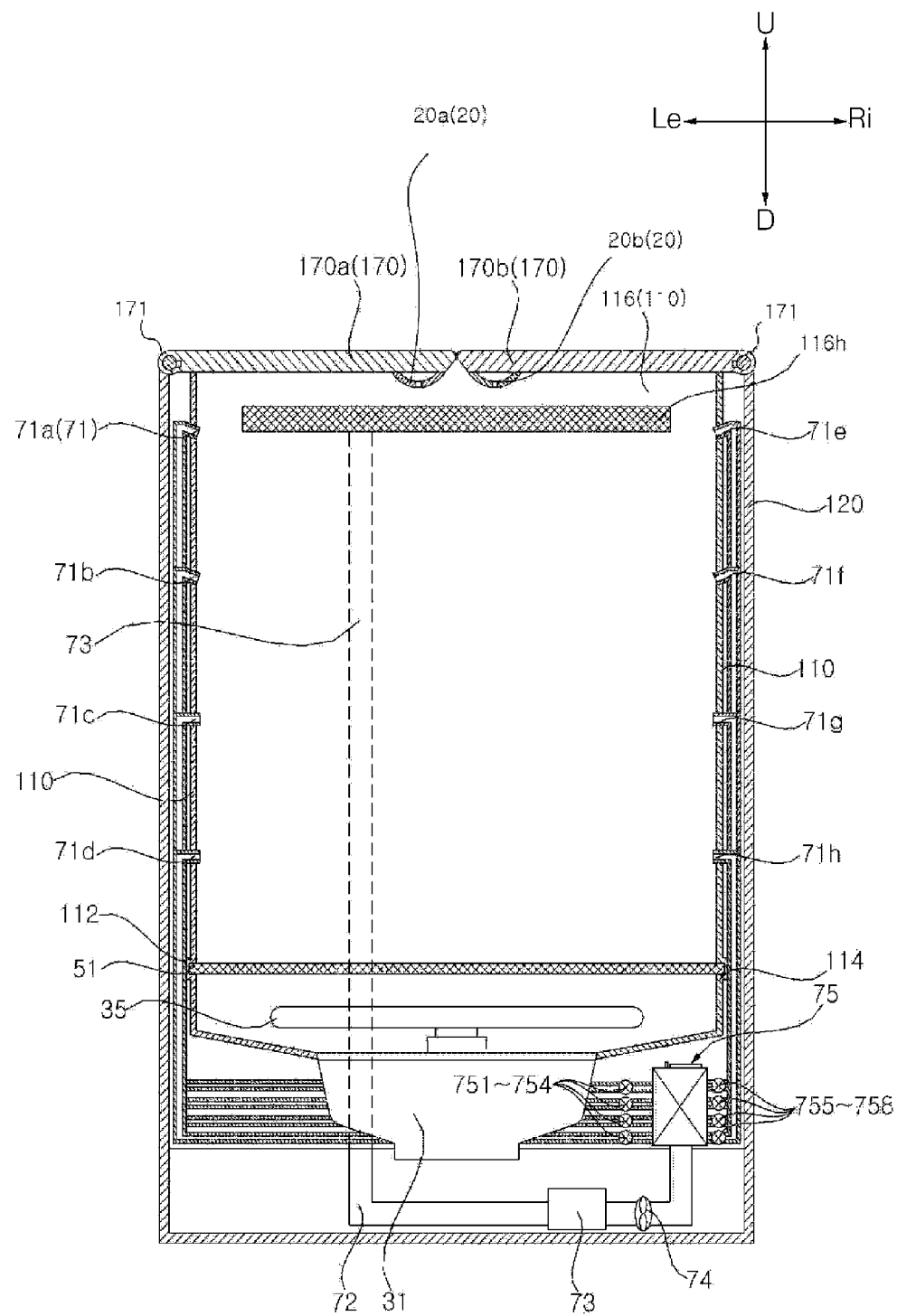
FIG. 9 is a view of a pet bath in accordance with another embodiment of the present disclosure.

FIG. 9 is a view of a pet bath in accordance with another embodiment of the present disclosure. Hereinafter, some parts in this embodiment which are substantially the same as those in the former embodiment are denoted by the same reference numerals, and a detailed description thereof will thus be omitted because it is considered to be unnecessary.

Referring to FIG. 9, in a pet bath 1b in accordance with another embodiment of the present disclosure, a pair of movable arms 170, i.e., a first movable arm 170a and a second movable arm 170b, may be upper covers which open and close an opening h2 (in FIG. 1) formed through the upper surface of a casing 10. In this case, respective lowered positions of the first movable arm 170a and the second movable arm 170b become positions for closing the opening h2, i.e., closed positions, and respective raised positions of the first movable arm 170a and the second movable arm 170b become designated positions for opening the opening h2, i.e., opened positions. The first movable arm 170a and the second movable arm 170b at the closed positions may be substantially located to be coplanar with the upper surface of the casing 10, and the first movable arm 170a and the second movable arm 170b at the opened positions may form an acute angle with the upper surface of the casing 10.

When the pet bath 1b is not being used, the first movable arm 170a and the second movable arm 170b are respectively located at the closed positions thereof, and thus, the inside of the bathing enclosure R may be protected from dirt, and other objects may be placed on the flat upper surface of the pet bath 1b formed by the first movable arm 170a and the second movable arm 170b.

When a driving command is input through a control panel 16 under the condition that the opening h2 is closed by the first movable arm 170a and the second movable arm 170b, the controller 90 may control a movable arm driving unit 95 to arrange the first movable arm 170a and the second movable arm 170b at initial rotated positions which are predetermined. The initial rotated positions may be set based on a value input through the above-described rotation setting unit 162.

A pair of upper shower nozzles 20a and 20b corresponding to a pair of the movable arms 170a and 170b may be provided, and the pair of upper shower nozzles 20a and 20b may include a first upper shower nozzle 20a provided on the first movable arm 170a and a second upper shower nozzle 20b provided on the second movable arm 170b.

As apparent from the above description, a pet bath in accordance with the present disclosure has the following effects.

First, the upper surface of a bathing enclosure is open, and thus, stress experienced by a pet accommodated in the bathing enclosure due to claustrophobia in a closed place may be relieved.

Second, the pet may be bathed in the state in which the head of the pet protrudes from the open upper surface of the bathing enclosure, and thus, a sense of openness experienced by the pet may be enhanced, and it is possible to prevent the face of the pet from being wet.

Third, the height of upper shower nozzles is adjusted, and thus, the optimal spraying height corresponding to the height of the pet may be realized.

Fourth, the height of the upper shower nozzles is automatically varied, and thus, ease of use may be improved, and particularly, the height of the upper shower nozzles is automatically controlled depending on the kind of the pet input through an input unit, and optimal water spraying according to the kind of the pet may be achieved.

Fifth, the position of the upper shower nozzles may be higher than the overall height of the bathing enclosure, and thus, even a pet that is taller than the overall height of the bathing enclosure may be bathed.

Sixth, the upper shower nozzles are installed on upper covers operated to open and close the upper surface of the bathing enclosure in a hinged manner, and, thus, the height of the upper shower nozzles may be easily varied by adjusting an opening angle of the upper covers, and, if the pet bath is not used or the upper shower nozzles are not used, the upper covers may be closed so that other objects may be placed on the upper surface of the pet bath.

Seventh, water may be applied only to the trunk of the pet, and not to the face of the pet, and thus even a feline pet may be easily bathed.

Eighth, the upper surface of the bathing enclosure is open, and thus, an echo of noise caused by operation of a pump or spraying of water in the bathing enclosure may be prevented and thereby stress applied to the pet due to the noise in the bathing enclosure may be alleviated.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A pet bath comprising:
    a casing that defines a bathing enclosure, the casing having a front surface that defines an entrance to the bathing enclosure and an upper surface that is open;
    a door configured to open and close the entrance;
    at least one movable arm rotatably coupled to the casing and configured to rotate vertically upward relative to the upper surface of the casing, the at least one movable arm comprising a first movable arm and a second movable arm that are provided at opposing sides of the upper surface of the casing;
    at least one upper shower nozzle that is provided at the first movable arm or the second movable arm, the at least one upper shower nozzle being disposed vertically higher than the upper surface of the casing and configured to spray water into the bathing enclosure in a state in which the upper surface of the casing is opened; and
    at least one arm driving unit configured to rotate the first movable arm or the second movable arm or both.

2. The pet bath according to claim 1, wherein the at least one upper shower nozzle comprises a first upper shower nozzle provided at the first movable arm and a second upper shower nozzle provided at the second movable arm.

3. The pet bath according to claim 2, wherein each of the first and second movable arms comprises a casing coupling part that couples the first and second movable arms to the casing at respective opposing sides of the upper surface to thereby form a pivot joint, and
    wherein the first upper shower nozzle and the second upper shower nozzle are disposed at positions spaced apart from the casing coupling parts and comprise a plurality of spray holes that are arranged along a direction parallel to an axial direction of the pivot joints.

4. The pet bath according to claim 1, further comprising a rotation setting unit configured to receive a command for controlling a rotation angle of at least one of the first movable arm or the second movable arm.

5. The pet bath according to claim 1, wherein each of the first movable arm and the second movable arm is horizontally positioned over at least a portion of an opening defined by the upper surface of the casing.

6. The pet bath according to claim 5, wherein each of the first movable arm and the second movable arm is configured to be rotated between a closed position that covers the opening and an opened position that uncovers the opening.

7. The pet bath according to claim 1, further comprising:
    a shower water supply hose made of a flexible material and configured to guide water therein; and
    a movable shower nozzle connected to the shower water supply hose and disposed outside the casing, the movable shower nozzle being configured spray water into the bathing enclosure.

8. The pet bath according to claim 1, further comprising a stand that is positioned within the casing and configured to support a pet thereon, the stand being configured to move relative to the casing via rollers,
    wherein a lower end of the door is rotatably connected to the casing, and at least one rail is provided on a rear surface of the door that faces the bathing enclosure, the rail being configured, based on the door being opened such that the rear surface of the door is horizontally oriented, to guide a movement of at least one of the rollers.

9. The pet bath according to claim 8, wherein the bathing enclosure has a discharge hole defined at a bottom surface of the bathing enclosure and configured to discharge water sprayed from the at least one upper shower nozzle, and
    wherein the pet bath further comprises:
    a water collection tank disposed under the bathing enclosure in the casing and configured to collect water discharged through the discharge hole, and a pump configured to circulate water collected in the water collection tank to the at least one upper shower nozzle.

10. The pet bath according to claim 9, further comprising a lower shower nozzle disposed under the stand and configured to spray water pumped by the pump in an upward direction.

11. The pet bath according to claim 10, further comprising a filter configured to filter water that has been discharged through the discharge hole and collected in the water collection tank.

12. The pet bath according to claim 8, wherein the at least one rail is configured to receive and engage the at least one of the rollers to thereby guide the movement of the at least one of the rollers.

13. The pet bath according to claim 12, wherein the at least one rail is provided as a groove that is defined at the rear surface of the door.

14. The pet bath according to claim 8, wherein the stand is configured to be withdrawn completely out of the bathing enclosure via the rollers.

15. The pet bath according to claim 1, wherein each of the first movable arm and the second movable arm is configured to open and close at least a portion of the upper surface of the casing, and
wherein the at least one upper shower nozzle is configured to spray water into the bathing enclosure in a state in which at least one of the first movable arm or the second movable arm opens at least the portion of the upper surface of the casing.

16. The pet bath according to claim 1, wherein the at least one arm driving unit configured to rotate at least one of the first movable arm or the second movable arm to one or more positions vertically higher than the upper surface of the casing such that at least a portion of the upper surface of the casing is opened.

17. The pet bath according to claim 1, wherein the at least one upper shower nozzle is configured to spray water into the bathing enclosure based on the first movable arm or the second movable arm rotating to a position corresponding to a height of a pet.

* * * * *